Jan. 26, 1971  A. KANICS  3,558,195

PNEUMATIC CONVEYOR

Filed Aug. 7, 1968

INVENTOR
ANDRAS KANICS

Edmund M. Jaskiewicz
ATTORNEY

United States Patent Office 3,558,195
Patented Jan. 26, 1971

3,558,195
PNEUMATIC CONVEYOR
Andras Kanics, Planegg, Germany, assignor to
Dr. Wolfang Fendt, Grafelfing, Germany
Filed Aug. 7, 1968, Ser. No. 750,964
Claims priority, application Germany, Aug. 12, 1967,
1,556,045
Int. Cl. B65g 53/04
U.S. Cl. 302—24                                    7 Claims

ABSTRACT OF THE DISCLOSURE

A pneumatic pipe line conveyor consisting of an outer conveyor tube and a gas supply tube of smaller diameter within the conveyor tube and resting on the lower portion thereof. There is a plurality of gas discharge openings along the gas supply tube and deflecting surfaces are provided adjacent the openings to deflect the discharged gases in substantially the direction of movement of bulk material through the conveyor tube. The energy of the discharged gas thus assists in moving the bulk material through the conveyor tube.

---

The present invention relates to a pipe line for pneumatically conveying bulk material therethrough, more particularly, to an arrangement for discharging gas within the conveyor tube from a gas supply tube positioned within the conveyor tube so that the discharged gas assists in moving the bulk material.

Bulk materials regardless of their particle size and which can be poured in the manner of a fluid have been conveyed through pneumatic pipe lines. Many forms of such pipe lines have been devised wherein a suitable gas moving through an outer conveyor tube carries the bulk material along within the tube The gas may be supplied into the conveyor tube in a number of ways. One known arrangement is to place a gas supply tube or pipe which is of smaller diameter than the conveyor tube within the conveyor tube. The gas tube thus rests on the inner surface of the lower portion of the conveyor tube and the remaining cross-sectional area of the conveyor tube is free and defines a material conveying passage. This type of pipe line may be termed a "thick current conveyor" which means that a relatively large quantity of bulk material is conveyed by the moving current of air or other gas. The speed of movement of the material within the conveyor tube is relatively slow and the material is not distributed uniformly within the stream of air but is separated into successive slugs. Within each slug of material practically the entire cross-sectional area of the material conveying passage will be filled with the material and this material will have only a small degree of fluidity. Between successive slugs there will be hardly any bulk material but only the conveying gas under pressure. One advantage of this pipe line conveyor is that the material is conveyed at very low speeds and, as a result, will not become pulverized.

In such pipe line conveyors the gas is discharged through a number of openings in the gas supply tube. The gas is discharged substantially radially from the gas supply tube and the energy of the escaping gas does not assist in moving the material through the conveyor.

Another general form of a pipe line conveyor is known as a "thin current conveyor" wherein a relatively large quantity of gas under pressure flowing at a relatively high-speed is used to convey the material. Into this high-speed stream of gas a relatively small quantity of bulk material is introduced with the material being distributed uniformly within the moving stream. This, however, has the disadvantage of greatly increasing the quantity of gas which must be used and as a result the operating costs of this pipe line are correspondingly increased.

Deflectors or baffles may be mounted on the gas supply tube at an angle to the axis of the gas supply tube so that the gas discharged therefrom will be in the general direction of movement of the material conveyed through the pipe line.

It is therefore the principal object of the present invention to provide a pneumatic pipe line conveyor wherein the gas for conveying the material is discharged into the conveyor tube in such a manner so as to assist in the movement of the material through the pipe line.

The objects of the present invention are attained and of the prior inventions are improved by the pneumatic conveyor pipe line of the present invention. A material conveying passage is thus defined in the space between the outer conveyor tube and the gas supply tube. The gas supply tube is provided with openings along its length for discharging gas therefrom into the material conveying passage. The gas is under pressure and generally comprises compressed air, however, other suitable gases may be used such as atmospheric nitrogen in order to avoid oxidation of the material being conveyed. Deflecting surfaces are provided on the gas supply tube for guiding the discharged gases in the direction of movement of bulk material in the conveying passage. The discharged gases may be substantially parallel to the central axis of the gas supply tube or at a slight angle to this axis. As a result, the energy of the discharged gas will assist in moving the bulk material through the conveyor tube.

The gas supply tube may comprise a plurality of sections with successive sections being interconnected by nipples inserted therein. The gas discharge openings may be formed in those portions of the nipples within the downstream ends of the sections. The use of the nipples to interconnect successive sections of the gas supply tube significantly facilitates the assembly of the tube.

Because of the location of the gas supply tube in the lower portion of the conveyor tube and because of the manner in which the streams of gas discharging from the supply tube mix with the bulk material, the bulk material will be immediately conveyed in the forward direction instead of settling on the wall of the conveyor tube. As a result of this characteristic, this conveyor arrangement will provide a significantly improved performance as compared to other conveyor systems using gas supply tubes. In addition, the functioning of the gas discharge openings in the connecting nipples of the gas supply tube of the present invention enables one to calculate accurately the quantity of bulk material which will be conveyed when the flow of air through the gas supply tube has been determined. Such a calculation of output cannot be done with known pneumatic conveyors using known gas discharge openings.

Other objects and advantages of the present invention will be apparent upon reference to the accompanying description when taken in conjunction with the following drawings wherein.

Proceeding next to the drawings wherein like reference symbols indicate the same parts throughout the various views a specific embodiment and modification of the present invention will be described in detail.

Figure 1:
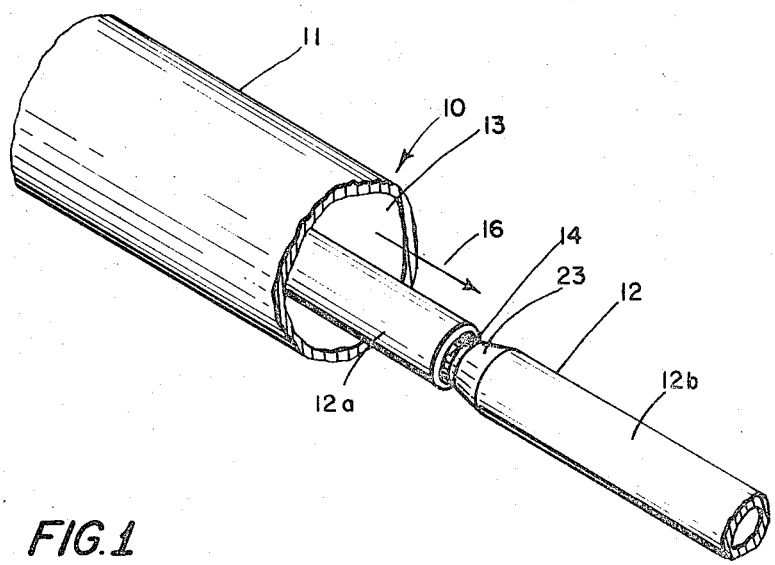
FIG. 1 is a perspective view of a portion of the pneumatic pipe line according to the present invention with a portion of the outer conveyor tube being cut away to better illustrate the inner gas supply tube.

The pneumatic pipe line conveyor disclosed as the present invention is indicated generally at 10 in FIG. 1 and comprises an outer conveyor tube 11 in which there is positioned a gas supply tube 12. The gas supply tube 12 is of a smaller diameter than the outer conveyor tube and rests on the inner surface of the lower portion of the conveyor tube as shown in FIG. 1. The space within the outer conveyor tube between the inner surface of the outer conveyor tube and the gas supply tube defines a material conveying passage 13.

The gas supply tube 12 is formed of a plurality of sections of which 12a and 12b are shown in FIG. 1. These sections are interconnected by nipples 14 the ends of which are inserted into the adjacent ends of successive sections as shown in the drawings.

Figure 2:
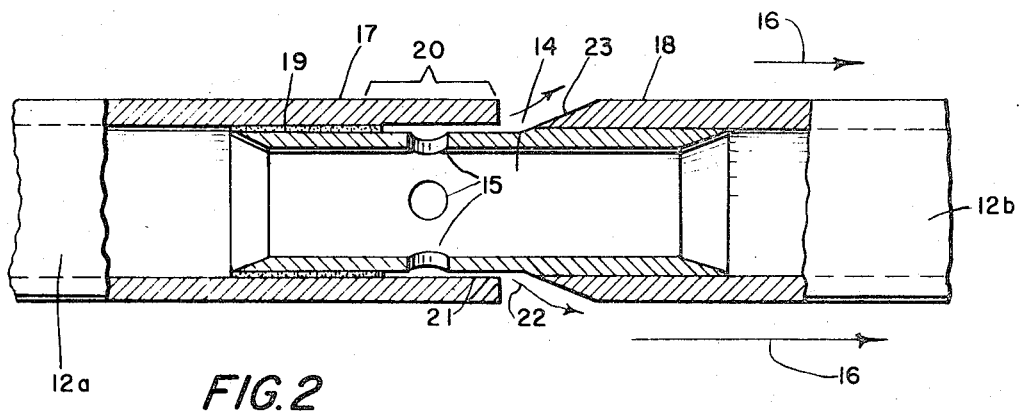
FIG. 2 is an elevational view of a portion of the gas supply tube with portions of the adjoining ends of the tube sections and the connecting nipple being shown in section.

As may be seen in FIG. 2 each nipple 14 comprises a plurality of circumferentially spaced openings 15 through which pressurized gas is discharged.

The material is moved through the conveying passage 13 in the direction of the arrow 16. Thus, in FIG. 2 the nipple 14 is shown as having one end inserted into the downstream end 17 of tube section 12a and into the upstream end 18 of tube section 12b. The portion of the nipple inwardly of gas discharge openings 15 is sealed to the inner surface of tube section 12a by a suitable adhesive will in the region 19. It will be apparent that the adhesive will depend on the nature of the materials of the nipple and tube sections. The region at the extreme end of the tube section 12a and indicated at 20 will be free from adhesive and thus will define a thin annular space 21 through which the gas exits in the direction of the arrow 22 into the material conveying passage.

The extreme end of the upstream end 18 of the tube section 12b is tapered at 23 at a slight angle to the central axis of the nipple to form an inclined guiding or deflecting surface to guide the discharged gas toward the direction of movement of the material through the conveying passage.

The sections of the gas supply pipe 12 may be formed of an elastic material, such as an elastic synthetic resin. The gas supply tube sections can be made of a rigid or of an elastic synthetic material so that the region 20 at the downstream end of each section will provide a permanently open annular gas exit.

Figure 3:
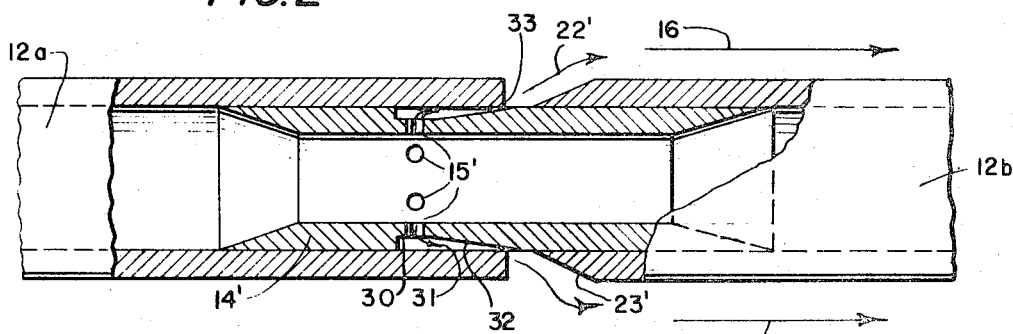
FIG. 3 is a view similar to that of FIG. 2 and showing a modification of the connecting nipple.

In the modification of FIG. 3 the nipple 14' has its gas discharge openings 15' opening into the bottom 30 of an annular groove 31 formed in the outer surface of the nipple 14'. The wall of the groove on the downstream side thereof is inclined or sloping as shown at 32 to form an inner guide surface for the discharged pressurized gas. The discharged gas exits at 22' through an annular slit 33. It is noted that the tapered end 23' of the section 12b forms substantially a continuation of the sloping wall 32 of the annular groove in the nipple.

The inner surface of the downstream end of section 12a forms with the sloping groove wall 32 a converging annular space which terminates in the annular slit 33 through which the gas exists into the conveying passage.

The optimum spacing of the gas discharge openings 15, 15' along the inner gas supply tube will depend on the pneumatic and physical properties of the material to be conveyed and can vary from 20 cm. to 10 m. The spacing will depend upon a variety of factors which include the adhesion and cohesion of the particles of the material and on the water of crystallization, the surface moisture of the particles, the electrostatic charges and surface hardness of the particles and of the walls of the conveyor tube 11 and gas supply tube sections 12a and 12b. In addition, the specific gravity of the material being conveyed will have some consideration on the spacing of the gas discharge openings.

The pressurized gas or compressed air can be supplied to the gas supply tube in any one of a number of known ways. A conduit connected to a source of pressurized gas can be positioned along side the outer conveyor tube 11 and have branch conduits passing through openings in the wall of the conveyor tube into the gas supply tube 12. These branch conduits can be spaced from each other at much greater distances than the spacing between the gas discharge openings along the gas supply tube. With this arrangement the gas supply tube will be supplied with pressurized gas along the entire length of the supply conduit. It will be apparent that after the pressurized gas enters the gas supply tube 12 the gas may flow in either the upstream or downstream directions with reference to the direction arrow 16. It is only necessary that the gas which is discharged into the conveying passage 13 should flow in the downstream direction, or in the direction of arrow 16. It is immaterial in which direction the gas moves within the gas supply tube 12.

The present invention has disclosed the inner gas supply tube 12 as merely resting loosely on the bottom surface of the outer conveyor tube 11. However, the gas supply tube may be fastened to the inner surface of the outer conveyor tube in a suitable manner such as by an adhesive or vulcanization. Fastening of the gas supply tube may be desirable in order to resist the recoil effect that may result from the discharge of the gases into the material conveying passage. This recoil effect acts mainly in the longitudinal direction.

The inner gas supply pipe according to the present invention can be installed into existing single tube conveyor pipe lines. The existing conveyor pipe lines will then function as the outer conveyor tube according to the present invention.

It will be apparent that it is preferable that the angles of inclination of the guiding and deflecting surfaces on the nipples and upstream ends of the tube sections be as small as possible with respect to the central longitudinal axis of the gas supply tube. As a result, the gases will be discharged in a direction which is substantially parallel to the direction of movement of the material through the passage.

The modification in the nipple wherein an external annular groove is provided has the advantage of permitting the amount of discharged gas to be accurately calculated since the quantity of discharged gas depends on the cross sectional areas of the gas discharge openings and on the gas pressure in the gas supply tube.

Thus it can be seen that the present invention has disclosed a pneumatic pipe line conveyor wherein the as used to convey the material therethrough is discharged into the conveyor in a direction which is substantially parallel to the direction of movement of the material. The kinetic energy of the discharged gas will thus be utilized in moving the material through the conveying passage.

It will be understood that this invention is subject to modification in order to adapt it to different uses and conditions and, accordingly, it is desired to comprehend such modification within this invention as may fall within the scope of the appended claims.

What is claimed is:

1. A pneumatic pipe line for conveying bulk material and comprising a conveyor tube, a gas supply tube of smaller diameter than said conveyor tube and disposed within said conveyor tube on the lower portion thereof so that a material conveying passage is defined between said conveyor and gas supply tubes, there being openings along said gas supply tube for discharging gas therefrom into said conveying passage, and means on said inner tube for deflecting the discharged gases toward the direction of movement of bulk material in the conveying passage so that the energy of the discharged gases assists in moving the bulk material, said gas supply tube comprising a plurality of sections, nipples inserted within the adjacent ends of successive sections to interconnect the sections, the discharge openings being in the portions of the nipples within the downstream directed ends of the sections whereby the inner surfaces of the downstream ends of the sections deflect the discharged gas toward the direction of movement of the bulk material.

2. A pneumatic pipe line as claimed in claim 1 with there being an annular space between the inner surface of the downstream end of a section and the outer surface of the nipple portion received therein so that the discharged gas is guided toward the direction of movement by both the inner surface of the section and outer surface of the nipple.

3. A pneumatic pipe line as claimed in claim 1 wherein the nipple has an annular groove in the outer surface thereof with the openings being in the bottom of the groove.

4. A pneumatic pipe line as claimed in claim 3 with the downstream side of the annular groove being inclined at an angle with respect to the axis of the nipple whereby the inclined side of the groove and the inner face of the section define a converging annular space and the inclined side guides the gas discharged from the openings.

5. A pneumatic pipe line as claimed in claim 1 with only the portion of the nipple inwardly of the gas discharge openings being adhered to the inner face of the tube section whereby the discharged gas passes between the section and nipple to exit in the direction of movement of the bulk material in the conveying passage.

6. A pneumatic pipe line as claimed in claim 1 with the upstream end of a tube section being tapered whereby the tapered end defines a guide surface for the gas discharged from the downstream end of the adjacent section.

7. A pneumatic pipe line as claimed in claim 1 with the sections of the gas supply tube being made from an elastic synthetic resin material.

References Cited

UNITED STATES PATENTS

| | | | |
|---|---|---|---|
| 2,882,097 | 4/1959 | Hamren | 302—29 |
| 3,253,865 | 5/1966 | Kanics | 302—29 |

ANDRES H. NIELSEN, Primary Examiner

U.S. Cl. X.R.

302—31